Figure 1:
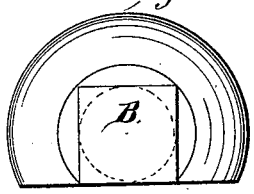
Figure 2:
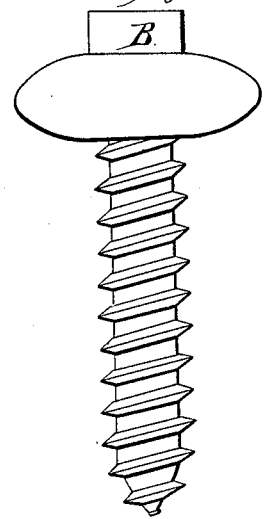

A. Arnold,

Fastening Railroad Rails.

Nº 46,842.      Patented Mar. 14, 1865.

Witnesses:
H. B. Stanton
J. Cady Eaton

Inventor:
Alfred Arnold

UNITED STATES PATENT OFFICE.

ALFRED ARNOLD, OF NORTH ENGLEWOOD, NEW JERSEY, ASSIGNOR TO HIMSELF, H. B. STANTON, AND D. C. EATON.

SCREWS FOR FASTENING RAILROAD-RAILS.

Specification forming part of Letters Patent No. 46,842, dated March 14, 1865.

*To all whom it may concern:*

Be it known that I, ALFRED ARNOLD, of North Englewood, Bergen county, State of New Jersey, have invented a new and useful Improvement in Screws for Fastening Railroad-Rails to their Ties or Sleepers.

My invention consists in a screw with a head of such form as is necessary to adapt it to the purpose of fastening railroad-rails to the ties or sleepers which support them.

My improved screw is so formed that when screwed down to the rail there will be but one point in its revolution at which the head will not project over the flange or seat of the rail, and at all other points of its revolution the head will project over and cover more or less of the surface of the flange or seat, and thus hold the rail firmly in place. Some of the advantages of this form of head over that of a "double-hooked head-screw" (so called, and which under that name has been patented) are, first, the much larger area of the head of my screw over that just mentioned increases the comparative strength of mine; second, this larger area makes it more probable that at the moment when the head of my screw comes into such contact with the flange of the rail as to press the rail so closely to the tie as to insure safety, the flange will, by my screw, be covered by a larger area of head and the rail be thus more firmly fastened and held to the tie, and in the act of screwing down this larger area of head will be more likely to enable my screw to hold the rail to the tie so tightly as to insure safety before the head approaches so nearly to the point where it leaves the rail free as to render its hold upon the rail doubtful and hazardous; third, if the rail should become loose by use—as, for example, by the wearing away of the tie by the friction of the rail, or otherwise—the rail might often, on account of this larger area of head of my screw, be more conveniently and certainly made sufficiently tight again.

When it is desired to remove and replace rails, it is only necessary to give my screw a partial turn to leave the rail perfectly free, and when a rail is to be replaced it can be done much more quickly than by the use of spikes; but railroad improvements of this kind, where life and property are at stake, should not only be more convenient and economical, if possible, but must at all events be strong and safe.

It will be seen from the following description and accompanying drawings, which are made a part of this specification, that my improved screw more surely fills this last-mentioned requisite than any fastener previously known.

Figure I is a view of the top of the head, in which the head is very nearly a semicircle, and in which the red dots designate the place where the spindle or screw proper is joined to the head. B is a square boss or elevation of suitable size and height to admit of the application thereto of a wrench for the purpose of turning the screw.

Fig. II is a vertical view of the screw, which shows the boss B and the lines of the upper and under surfaces of the head, in which it is seen that the surfaces are beveled, the head being thinner at its outer edge than where it joins the screw. The head of the screw may be made in any shape approaching a semicircle. The boss B may also be dispensed with, and any other of the well-known plans for turning the screw substituted therefor; but I prefer the shape and arrangement shown. Of course, the screw (including its head) should be made of suitable metal and be of sufficient length and diameter to securely fasten and hold rails to their ties or sleepers.

The length and diameter of the screw proper and the depth and fineness of its thread must depend on the quality of the metal used and the amount of strength required to thus secure the rails. So, also, of the area and thickness of the head, though the size and bevel of the head must depend somewhat on the form of the rail to which it is to be applied.

I do not claim, broadly, a screw for fastening railroad-rails to their ties or sleepers, neither do I claim "the combination of a double-hooked head with a wood-screw" for that purpose (as already patented;) but What I do claim as my invention as a new manufacture, and desire to secure by Letters Patent, is—

A screw with a head suitably adapted to railroad-rails to hold the rails firmly to their ties or sleepers, and which has but one point in its revolution to free the rails and admit of their removal, substantially as herein described, and for the purposes herein specified.

ALFRED ARNOLD.

Witnesses:
H. B. STANTON,
D. CADY EATON.